(12) United States Patent
Klementowicz, III et al.

(10) Patent No.: US 7,967,326 B2
(45) Date of Patent: Jun. 28, 2011

(54) TACTICAL BREACHING DEMONSTRATION TRAILER

(75) Inventors: Nicholas Klementowicz, III, Hillsborough, NJ (US); John A. Dapkins, Jr., Bloomsbury, NJ (US); Kenneth P. Glynn, Flemington, NJ (US)

(73) Assignee: Jersey Tactical Corp., Flemington, NJ (US)

( * ) Notice: Subject to any disclaimer, the term of this patent is extended or adjusted under 35 U.S.C. 154(b) by 467 days.

(21) Appl. No.: 12/290,719

(22) Filed: Nov. 3, 2008

(65) Prior Publication Data

US 2010/0109294 A1    May 6, 2010

(51) Int. Cl.
*B62B 3/00* (2006.01)
(52) U.S. Cl. ........................................ 280/656; 434/226
(58) Field of Classification Search .................. 280/656; 434/226
See application file for complete search history.

(56) References Cited

U.S. PATENT DOCUMENTS

| | | | |
|---|---|---|---|
| 4,526,548 A * | 7/1985 | Livingston | 434/226 |
| 5,173,052 A * | 12/1992 | Duncan, Jr. | 434/226 |
| 5,752,835 A * | 5/1998 | Whitmer, Sr. | 434/226 |
| 5,906,493 A | 5/1999 | Bishop | |
| 6,877,988 B2 * | 4/2005 | Phillips et al. | 434/226 |
| 7,901,212 B2 * | 3/2011 | Quinn et al. | 434/226 |
| 2005/0058974 A1 * | 3/2005 | Phillips et al. | 434/226 |
| 2005/0233289 A1 * | 10/2005 | Hoglund | 434/226 |
| 2008/0014564 A1 * | 1/2008 | Allen | 434/226 |
| 2009/0208914 A1 * | 8/2009 | Phillips et al. | 434/219 |
| 2009/0215014 A1 * | 8/2009 | Walker | 434/226 |
| 2010/0109294 A1 * | 5/2010 | Klementowicz et al. | 280/656 |

* cited by examiner

*Primary Examiner* — Jeffrey J Restifo
(74) *Attorney, Agent, or Firm* — Ernest D. Buff; Ernest D. Buff & Associates, LLC.

(57) ABSTRACT

A tactical breaching demonstration trailer includes: a) a trailer unit having a frame, at least one axle, at least two wheels, a hitch and a flatbed; b) a breaching cage for tactical breaching demonstration, the cage being connected to the flatbed of the trailer unit, the breaching cage having a cage frame creating at least one front wall frame having a doorway and having a door hingedly connected to the doorway with hinges so as to open inwardly when not latched, the door and doorway having a door latching mechanism to prevent the door from being swung open on the hinges, the latching mechanism including a breakaway feature to yield when the door is battered with a tactical ram; and, c) breaching cage support connected to at least one of the breaching cage and the flatbed and adapted to support the breaching cage in an upright position relative to the flatbed. In some embodiments, the cage is collapsible and/or removable.

20 Claims, 3 Drawing Sheets

TACTICAL BREACHING DEMONSTRATION TRAILER

BACKGROUND OF INVENTION a. Field of Invention

The invention relates generally to the ability to provide mobile demonstrations and training for tactical operations, such as ram breaching of doors, and windows, and lock and chain breaching as well. Thus, the present invention is a trailer that includes a breaching cage with unique features, including replaceable and breachable doors, panels, windows and the like. In preferred arrangements, the cage is collapsible and operates on hinges, and in some cases, with hoisting assistance mechanisms, such as hoist lines and locking winches the cages are preferably made of hollow tubing for combined lightweight and strength.

b. Description of Related Art

The following patents are representative of the field pertaining to the present invention:

U.S. Pat. No. 6,877,988 B2 to Phillips et al. describes a door breach training system and related method of use thereof. The system includes a door and frame with replaceable shear pins which are designed to break under known pressures to replicate pressures required to breach doors of varying physical characteristics and lock configurations.

U.S. Pat. No. 5,906,493 to Bishop describes a training device, for mounting to a standard door having a cutout at middle height, the door mounted in a door frame having a strike plate at middle height. A sliding box is mounted in the cutout for slidable motion toward and away from the strike plate. At least one spring is mounted between the sliding box and the cutout for biasing the sliding box toward the strike plate. The spring is selected to resist compression and thus motion of the sliding box away from the strike plate. The amount of resistance that the spring provides is equivalent to the amount of resistance presented by a doorknob and locking assembly on standard doors. Thus, a crowbar-like tool may be used to pry the sliding box away from the strike plate to open the door and simulate the force and action necessary to pry open any standard door.

Notwithstanding the prior art, the present invention is neither taught nor rendered obvious thereby.

SUMMARY OF INVENTION

The present invention is directed to a tactical breaching demonstration trailer. It includes: a) a trailer unit having a frame, at least one axle, at least two wheels, a hitch and a flatbed; b) a breaching cage for tactical breaching demonstration, the cage being connected to the flatbed of the trailer unit, the breaching cage having a cage frame creating at least one wall frame having a doorway and having a door hingedly connected to the doorway with hinges so as to open inwardly when not latched, the door and doorway having door latching means to prevent the door from being swung on the hinges, the latching means including a breakaway feature to yield when the door is battered with a tactical ram; and, c) breaching cage support means connected to at least one of the breaching cage and the flatbed and adapted to support the breaching cage in an upright position relative to the flatbed.

In some preferred embodiments of the present invention, the breaching cage is fixedly attached to the flatbed.

In some preferred embodiments of the present invention, the breaching cage is removably attached to the flatbed.

In some preferred embodiments of the present invention, the cage frame is a tubular metal cage frame.

In some preferred embodiments of the present invention, the door is a tubular frame door with replaceable door panels.

In some preferred embodiments of the present invention, the support means is connected to the flatbed and removably attachable to the breaching cage.

In some preferred embodiments of the present invention, the support means is connected to the breaching cage and removably attachable to the flatbed.

In some preferred embodiments of the present invention, the support means is a pair of opposing support walls hingedly connected to the breaching cage door frame.

In some preferred embodiments of the present invention, the support means pair of opposing walls are tubular frame walls having a right triangle configuration therein.

In some preferred embodiments of the present invention, the cage frame further includes a second wall and the second wall includes at least one window frame for inclusion of a window or simulated window for window raking and breaching demonstration.

The present invention is directed to a tactical breaching demonstration trailer. It includes: a) a trailer unit having a frame, at least one axle, at least two wheels, a hitch and a flatbed; b) a breaching cage for tactical breaching demonstration, the cage being connected to the flatbed of the trailer unit, the breaching cage having a cage frame creating at least one wall frame having a doorway and having a door hingedly connected to the doorway with hinges so as to open inwardly when not latched, the door and doorway having door latching means to prevent the door from being swung on the hinges, the latching means including a breakaway feature to yield when the door is battered with a tactical ram, the breaching cage further being hingedly connected to the flatbed so as to have a first position, being an upright position for demonstrations and having a second position, being a down position for securing and transporting; and, c) breaching cage support means connected to at least one of the breaching cage and the flatbed and adapted to support the breaching cage in an upright position relative to the flatbed.

In some preferred embodiments of the present invention, the breaching cage is fixedly attached to the flatbed.

In some preferred embodiments of the present invention, the breaching cage is removably attached to the flatbed.

In some preferred embodiments of the present invention, the cage frame is a tubular metal cage frame.

In some preferred embodiments of the present invention, the door is a tubular frame door with replaceable door panels.

In some preferred embodiments of the present invention, the support means is connected to the flatbed and removably attachable to the breaching cage.

In some preferred embodiments of the present invention, the support means is connected to the breaching cage and removably attachable to the flatbed.

In some preferred embodiments of the present invention, the support means is a pair of opposing support walls hingedly connected to the breaching cage door frame.

In some preferred embodiments of the present invention, the support means pair of opposing walls are tubular frame walls having a right triangle configuration therein.

In some preferred embodiments of the present invention, the cage frame further includes a second wall and the second wall includes at least one window frame for inclusion of a window or simulated window for window raking and breaching demonstration Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
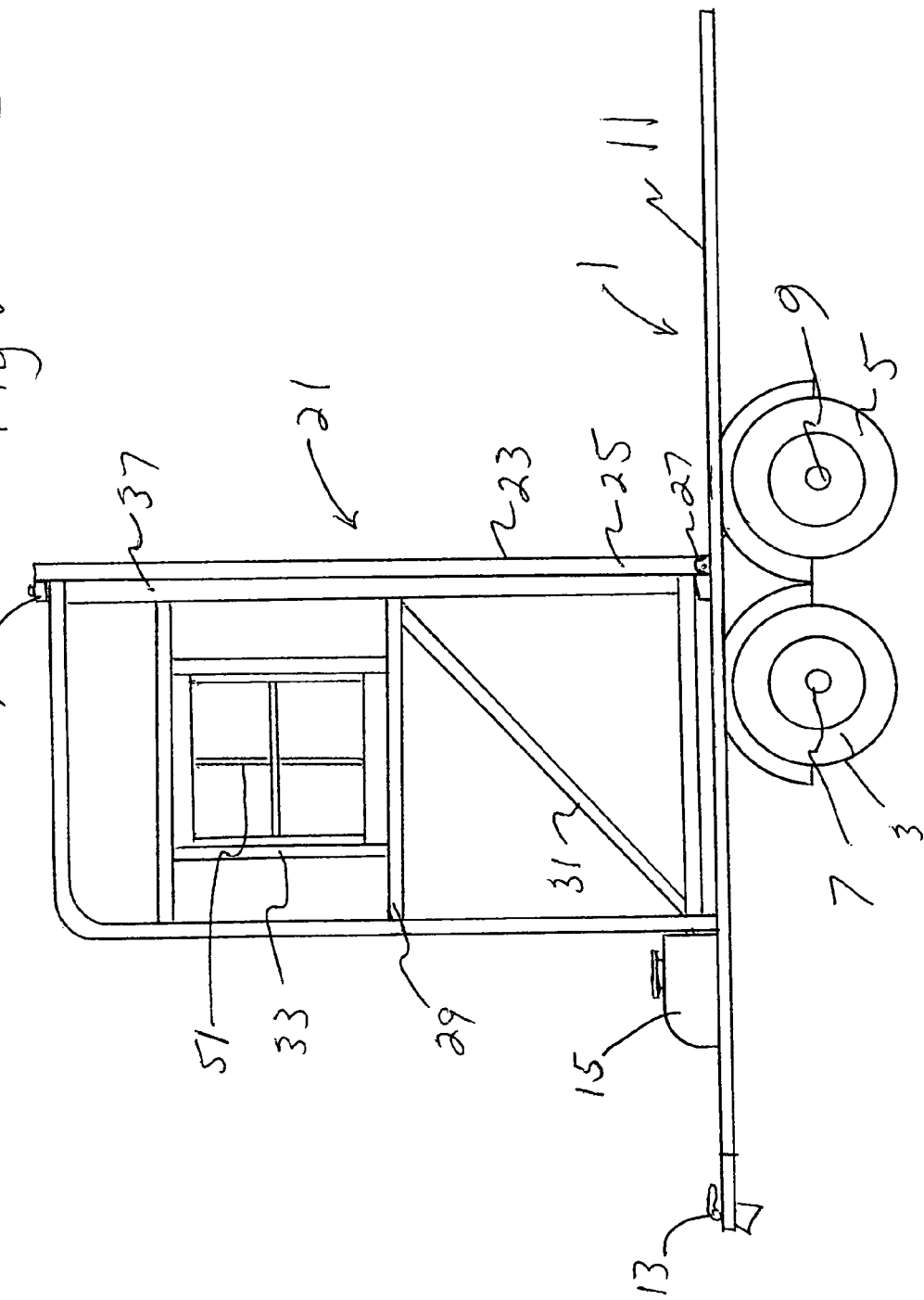
FIG. 1 shows a side view.
Figure 2:
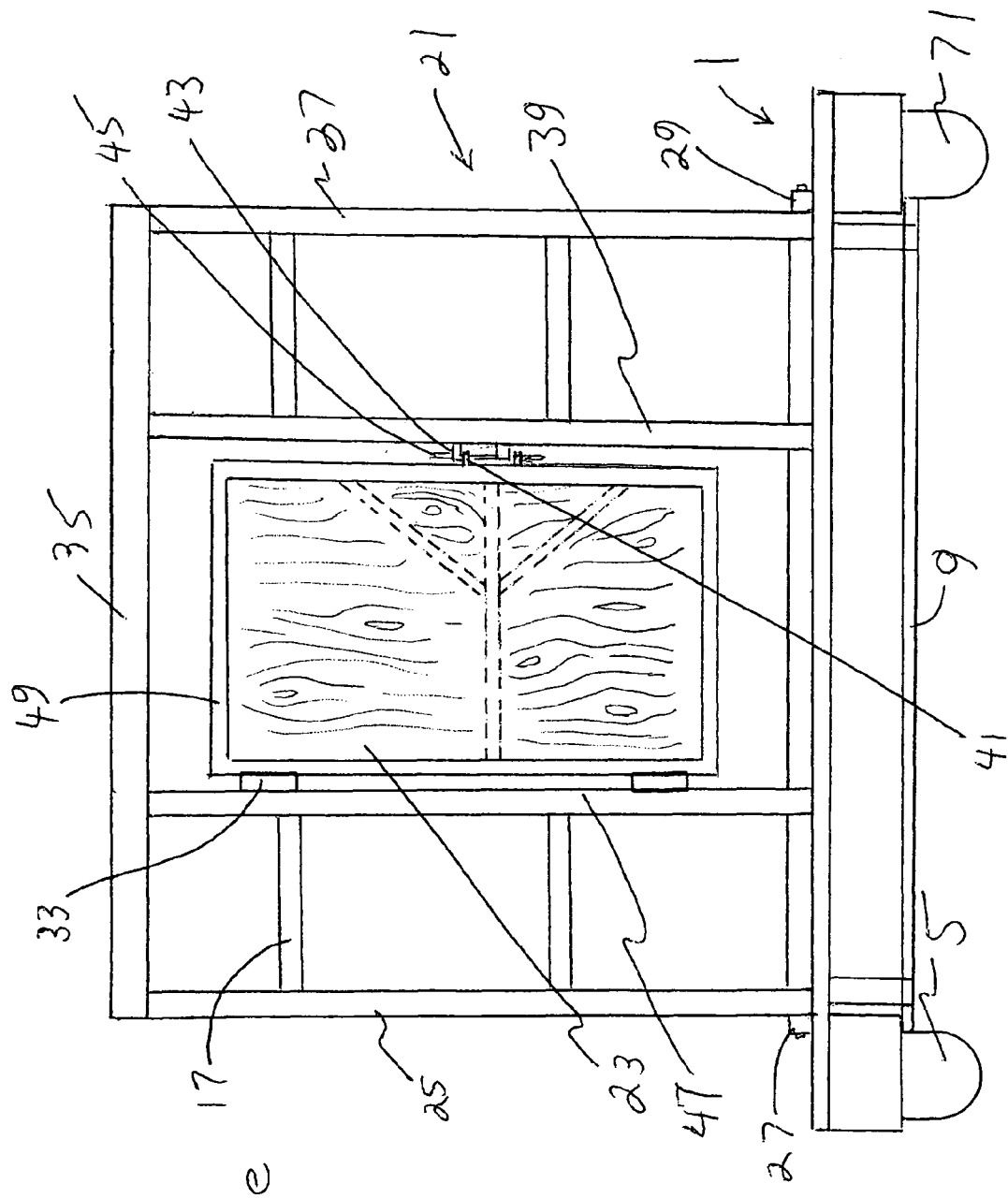
FIG. 2 shows a rear view of one embodiment of a present invention tactical breaching demonstration trailer with a breaching cage that includes a penetrable door for ram, lock and other breaching demonstrations, and practices; and, FIG. 3 is a diagrammatic representation of the various options and preferred features of the present invention tactical breaching demonstration trailer with a breaching cage.

FIG. 1 shows a side view and FIG. 2 shows a rear view of one embodiment of a present invention tactical breaching demonstration trailer with a breaching cage that includes a penetrable door for ram, lock and other breaching demonstrations, and practices. Specifically, and referring to both figures at the same time, wherein like elements are identically numbered, there is shown trailer unit 1 and breaching cage 21. Trailer 1, in this embodiment has duel axies 7 and 9, hence, four wheels, including wheels 3, 5, and 71. Any number of wheels may be included, as any trailer having a reasonably flat top surface that will accommodate standing stability and a swinging door for breaching.

In FIG. 1, mounted to trailer bed 11 is cage 21. Cage 21 has two side wall frames such as side wall frame 37 that functions as a support wall for front cage frame 35 and also, secondarily, supports a breachable window 51. The breachable window 51 is either slidably removable horizontally or slidably removable vertically within the sub-frame formed by tubular members such as tubes 29 and 33.

Further, side wall frame 37 is vertically hinged to front cage frame 35 at its top and bottom with hinge members, such as hinge member 39 so that side wall frame 37 and its corresponding opposite sidewall frame may be rotated upwardly to be flat against the back of front cage frame 35. Subsequently with the sidewall frames folded on the entire cage 21 may be rotated downwardly on to bed 11 for transporting and/or storage. Hinge pins 27 and 29, connected to bed 11 and to "front cage frame" 35 enables secure collapse and open-ready movement of side wall frame 35. In addition, exaggerated pull latch 15 secures side wall frame 37 when it is in the open-ready position as shown in FIG. 1.

Referring now to FIG. 2, there is shown a back view of trailer unit 1 with details of front cage frame 35. Front cage frame 35 is made of hollow rectangular tubular members such as corner tubes 25 and 27, cross members such as tube 17 and door frame member tubes 39 and 47. Tube 39 is a hinge-supporting frame member to which door hinges, such as door hinge 33, are attached. Door frame 49 with wood panel door insert 23 is hingedly connected to door frame tube 47. To the right of door frame 49 is door frame tube 39 with door latch 43. It interacts with latch member 41 on door frame 49 via dowel, wood or plastic insert 45. Insert 45 can be of varied dimensions and strengths and passes through door latch 43 and latch member 41. When wood panel door insert 23 is impacted with a ram, insert 45 will break and door frame 49 with wood panel door insert 23 will be breached successfully. Thus, a tactical officer or other person may repeatedly replace a broken insert 45 with a new one to repeatedly practice or demonstrate consistent r varied breaching techniques. In addition to the door breaching and window breaching above, chain and lock breaking techniques may be practiced or demonstrated by attaching chains and locks to various frame members of the cage 21.

Figure 3:
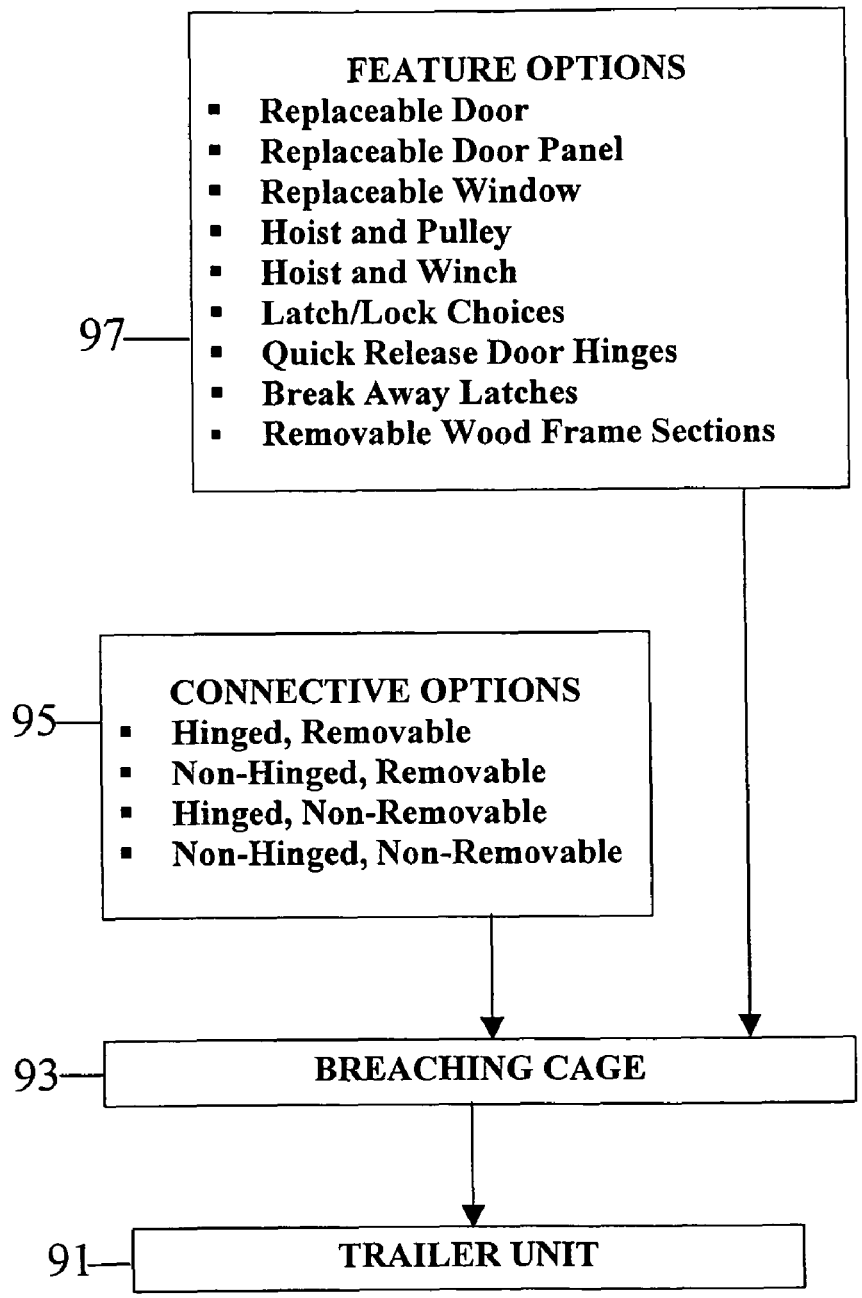

FIG. 3 is a diagrammatic representation of the various options and preferred features of the present invention tactical breaching demonstration trailer with a breaching cage. The present invention includes the trailer unit 91 that is any trailer that has wheels, a hitch and a bed that can support the breaching cage 93 along with one or more breachers. Thus, the trailer unit 91 has the breaching cage 93 mounted thereon, and there are many connective options 95 and other feature options 97. The connective options 97 include having the cage hinged to the bed, and either be removable or not, or having it not hinged to the bed and being removable or not some of the possible and preferred feature options include Replaceable Door, Replaceable Door Panel, Replaceable Window, Hoist and Pulley, Hoist and Winch, Latch/Lock Choices, Quick Release Door Hinges, Break Away Latches and Removable Wood Frame Sections Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A tactical breaching demonstration trailer, comprising:
 a) a trailer unit having a frame, at least one axle, at least two wheels, a hitch and a flatbed;
 b) a breaching cage for tactical breaching demonstration, said cage being connected to said flatbed of said trailer unit, said breaching cage having a cage frame creating at least one wall frame having a doorway and having a door hingedly connected to said doorway with hinges so as to open inwardly when not latched, said door and doorway having door latching means to prevent said door from being swung on said hinges, said latching means including a breakaway feature to yield when said door is battered with a tactical ram; and,
 c) breaching cage support means connected to at least one of said breaching cage and said flatbed and adapted to support said breaching cage in an upright position relative to said flatbed.

2. The tactical breaching demonstration trailer of claim 1 wherein said breaching cage is fixedly attached to said flatbed.

3. The tactical breaching demonstration trailer of claim 1 wherein said breaching cage is removably attached to said flatbed.

4. The tactical breaching demonstration trailer of claim 1 wherein said cage frame is a tubular metal cage frame.

5. The tactical breaching demonstration trailer of claim 1 wherein said door is a tubular frame door with replaceable door panels.

6. The tactical breaching demonstration trailer of claim 1 wherein said support means is connected to said flatbed and removably attachable to said breaching cage.

7. The tactical breaching demonstration trailer of claim 1 wherein said support means is connected to said breaching cage and removably attachable to said flatbed.

8. The tactical breaching demonstration trailer of claim 7 wherein said support means is a pair of opposing support walls hingedly connected to said breaching cage door frame.

9. The tactical breaching demonstration trailer of claim 8 wherein said support means pair of opposing walls are tubular frame walls having a right triangle configuration therein.

10. The tactical breaching demonstration trailer of claim 8 wherein said support means pair of opposing walls are tubular frame walls having a right triangle configuration therein.

11. The tactical breaching demonstration of claim 1 wherein said cage frame further includes a second wall and said second wall includes at least one window frame for inclusion of a window or simulated window for window raking and breaching demonstration.

12. A tactical breaching demonstration trailer, comprising:
   d) a trailer unit having a frame, at least one axle, at least two wheels, a hitch and a flatbed;
   e) a breaching cage for tactical breaching demonstration, said cage being connected to said flatbed of said trailer unit, said breaching cage having a cage frame creating at least one wall frame having a doorway and having a door hingedly connected to said doorway with hinges so as to open inwardly when not latched, said door and doorway having door latching means to prevent said door from being swung on said hinges, said latching means including a breakaway feature to yield when said door is battered with a tactical ram, said breaching cage further being hingedly connected to said flatbed so as to have a first position, being an upright position for demonstrations and having a second position, being a down position for securing and transporting; and,
   f) breaching cage support means connected to at least one of said breaching cage and said flatbed and adapted to support said breaching cage in an upright position relative to said flatbed.

13. The tactical breaching demonstration trailer of claim 12 wherein said breaching cage is fixedly attached to said flatbed.

14. The tactical breaching demonstration trailer of claim 12 wherein said breaching cage is removably attached to said flatbed.

15. The tactical breaching demonstration trailer of claim 12 wherein said cage frame is a tubular metal cage frame.

16. The tactical breaching demonstration trailer of claim 12 wherein said door is a tubular frame door with replaceable door panels.

17. The tactical breaching demonstration trailer of claim 12 wherein said support means is connected to said flatbed and removably attachable to said breaching cage.

18. The tactical breaching demonstration trailer of claim 12 wherein said support means is connected to said breaching cage and removably attachable to said flatbed.

19. The tactical breaching demonstration trailer of claim 18 wherein said support means is a pair of opposing support walls hingedly connected to said breaching cage door frame.

20. The tactical breaching demonstration of claim 12 wherein said cage frame further includes a second wall and said second wall includes at least one window frame for inclusion of a window or simulated window for window raking and breaching demonstration.

\* \* \* \* \*